R. H. GRAH.
ANIMAL TRAP.
APPLICATION FILED JAN. 8, 1912.
1,034,360.
Patented July 30, 1912.
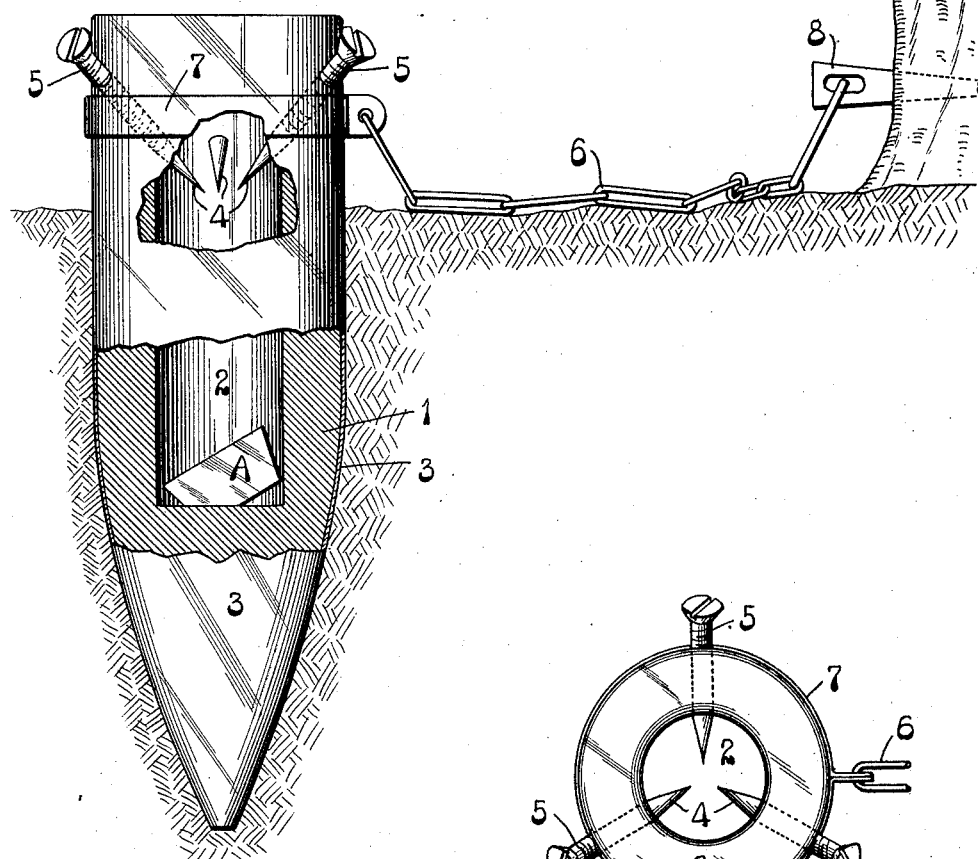
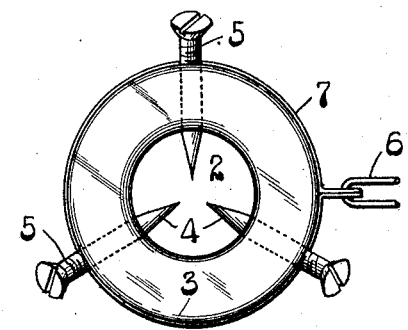
Attest
A. J. McCauley
E. B. Linn
Inventor:
R. H. Grah
by
Attys.

UNITED STATES PATENT OFFICE.

ROBERT HERMANN GRAH, OF CHESTER, ILLINOIS, ASSIGNOR TO FUNSTEN BROS. & COMPANY, OF ST. LOUIS, MISSOURI, A CORPORATION.

ANIMAL-TRAP.

1,034,360.  Specification of Letters Patent.  Patented July 30, 1912.

Application filed January 8, 1912. Serial No. 670,055.

*To all whom it may concern:*

Be it known that I, ROBERT H. GRAH, a citizen of the United States of America, and a resident of Chester, in the county of Randolph and State of Illinois, have invented certain new and useful Improvements in Animal-Traps, of which the following is a full, clear, and exact description, reference being had to the accompanying drawing, forming a part of this specification.

My invention relates to an animal trap, provided with a well, or cavity, serving as a receiver for a bait or lure that will attract wild animals, and the provision of means extending into said well or cavity between which the paw of an animal may be passed in an effort to secure the bait or lure mentioned, but which prevent the withdrawal of the animal's paw, thus resulting in its capture.

Figure I is a view partly in elevation, and partly in vertical section, of my trap. Fig. II is a top or plan view of the trap.

In the drawings:—1 designates the body of my trap which is of peg shape, in order that it may be readily driven into the ground and contains a well 2 serving as a repository for a bait or lure, indicated at A, Fig. I. The body 1 is preferably made of wood, and is preferably incased within an outer shell 3, of metal, that serves to protect the body from moisture in the ground in which the trap is driven; and, furthermore, as a means for preventing injury to the trap by being gnawed by animals when caught in the trap.

When my trap is in use, the propensity of animals which it may be desired to capture thereby is to introduce their paws into the well of the trap to withdraw the bait or lure therein; and, when an animal's paw is so introduced, its withdrawal is prevented by sharp pointed prongs 4 extending inwardly in the well 2 from the inner wall of the trap body and toward the bottom of the well in said body. These prongs converge toward a common center, and their points are sufficiently separated to permit the passage of an animal's paw therebetween, but are so closely associated as to enter into the paw or leg of the animal when an effort is made to withdraw it, thus resulting in the animal's capture. The prongs 4 are preferably formed upon screws 5 that extend in downwardly inclined directions through the upper portion of the trap body. The object in using screws having sharpened ends producing the prongs 4 is to permit of adjustment of said prongs, in order that their points may be properly disposed relative to each other, according to the size of the paw or leg of an animal that it may be desired to capture in the use of the trap. Another object of rendering the prongs adjustable is to enable a bait or lure larger than the normal space between the points of the prongs to be readily inserted or replaced.

My trap is particularly valuable in the capture of raccoons, and other animals having propensities similar to those of raccoons.

The body of my trap is preferably secured to a tree, or other object close to the point at which the trap is driven into the ground, in order that a captured animal may not, by drawing the trap from the ground, carry it away from the point at which it is set. As a convenient means of securing the trap to a tree, I utilize a chain 6 that is connected to a trap body by a band 7, and is provided at its other end with a spike 8 that may be driven into a tree, as seen in Fig. I.

I claim:—

1. An animal trap comprising a body provided with a bait well and inwardly inclined prongs adjustably supported in the wall of the trap whereby it is adapted for catching different sized animals and permitting the bait or lure to be inserted and replaced.

2. An animal trap, comprising a body provided with a bait well, and screws extending in downwardly inclined directions through said body into said bait well, the screws terminating in prong ends projecting into said well.

ROBERT HERMANN GRAH.

In the presence of—
RALPH E. SPRIGG,
MARY W. BALLARD.

Copies of this patent may be obtained for five cents each, by addressing the "Commissioner of Patents, Washington, D. C."